(12) United States Patent
Diwan et al.

(10) Patent No.: US 7,516,317 B2
(45) Date of Patent: Apr. 7, 2009

(54) MEASURING AN OPERATING SYSTEM'S BOOT DURATION

(75) Inventors: Shridhar Diwan, Hyderabad (IN); Vishal Mehrotra, Hyderabad (IN); Jay Herbison, Beijing (CN)

(73) Assignee: Microsoft Corporation, Redmond, WA (US)

( * ) Notice: Subject to any disclaimer, the term of this patent is extended or adjusted under 35 U.S.C. 154(b) by 396 days.

(21) Appl. No.: 11/324,198

(22) Filed: Dec. 29, 2005

(65) Prior Publication Data

US 2007/0162732 A1 Jul. 12, 2007

(51) Int. Cl.
  *G06F 9/00* (2006.01)
  *G06F 9/24* (2006.01)
  *G06F 15/177* (2006.01)
(52) U.S. Cl. ........................................ 713/1
(58) Field of Classification Search .............. 713/1
  See application file for complete search history.

(56) References Cited

U.S. PATENT DOCUMENTS

| | | | | |
|---|---|---|---|---|
| 5,475,844 | A | * | 12/1995 | Shiramizu et al. ........... 718/104 |
| 5,544,349 | A | * | 8/1996 | Berry et al. ................. 711/165 |
| 2002/0019723 | A1* | | 2/2002 | Zwiegincew et al. ........ 702/186 |
| 2004/0004617 | A1* | | 1/2004 | Street et al. ................. 345/440 |

OTHER PUBLICATIONS

Business Logic's Ultra WinCleaner Utility Suite 8. Copyright 1998-2008. Available at <http://www.wincleaner.com/>.
Iolo's System Mechanic 4 Professional. Copyright 1994-2003. Available at <http://www.m2.com>.
PC Pit Stop. Mar. 2000. Available at <http://www.pcpitstop.com>.
PC Tune utilities 2003. Available at <http://www.tune-up.com>.
Symantec's Norton SystemWorks 2004. 2004. Available at <http://www.amazon.com/Symantec-SystemWorks-2004-Standard/dp/B0000C8Y0W>.
V Communications' SystemSuite 5. Jul. 24, 2003. Available at <http://www.epinions.com/pr-Vcomm_SystemSuite_5_047875316157>.

* cited by examiner

*Primary Examiner*—Thomas Lee
*Assistant Examiner*—Mohammed H Rehman
(74) *Attorney, Agent, or Firm*—Perkins Coie LLP

(57) ABSTRACT

Techniques for measuring an operating system's boot duration are provided. The techniques include adding a startup application to an operating system's list of startup applications, determining when the startup application was invoked, and calculating a boot duration for the operating system. The techniques further include loading a log file containing indications of system activity occurring during a boot process, identifying a time interval having a peak system activity, identifying another time interval having a fraction of the peak system activity, and indicating that the boot process completes at a time during the second time interval.

7 Claims, 7 Drawing Sheets

MEASURING AN OPERATING SYSTEM'S BOOT DURATION

BACKGROUND

An operating system performs various tasks relating to a computer system, including managing its hardware and software resources. Hardware resources include processors, primary storage (e.g., memory), secondary storage (e.g., hard disk or optical disk), printers, display adapters, network interface cards, input/output ports, etc. Software resources include application programs, user interfaces, device drivers, network protocol stacks, etc. The operating system manages and coordinates these resources to complete various tasks, such as under the direction of an application program.

Application programs may be invoked by users of operating systems, an operating system itself, or by other components associated with operating systems, such as other application programs. Application programs are generally invoked after an operating system has completed booting up.

Booting up an operating system involves loading at least a portion of the operating system into a computer system's primary storage. The following background description pertains to booting up an operating system on a personal computer, such as one employing the MICROSOFT WINDOWS operating system. When the computer is turned on, its basic input-output system ("BIOS") may conduct a power-on self test to determine whether the computer's hardware components are operational. The BIOS may then retrieve a boot program that loads the operating system and copy information, such as a boot record, from the boot program into specific locations in primary storage. The BIOS may then branch to the boot record. The boot record may load an initial system file (e.g.; IO.SYS) into primary storage, which may load other portions of the operating system into primary storage, such as various operating system components.

Some of these operating system components include windows services, such as a windows logon ("winlogon") service. The winlogon service enables users to log into the operating system, such as by providing a user name and password. Once a user logs on, the operating system may load various startup applications. Startup applications may be previously indicated by the user or by operating system components, such as when an application is installed on the computer system. The user may then be able to start other applications.

Boot duration may be defined as the time interval between a boot start time and a boot end time. The boot start time can occur either when powering on a computer or when the BIOS invokes the boot program. The boot end time occurs when a user is able to use the computer system, such as to start an application. Over time, as an operating system accumulates components and startup applications, the operating system's boot duration may increase and thereby cause users to wait longer for a computer system to start. For example, as a user installs applications or hardware, the installation may add various components, such as drivers, to the operating system. These components may increase the boot duration of the operating system.

A user wishing to decrease boot duration or a service provider seeking to provide a service for improving operating system performance may need to automatically measure the operating system's boot duration.

SUMMARY

A facility is described for measuring an operating system's boot duration (the "facility"). The facility measures boot duration based on when a menu becomes usable, when a user is able to launch an application, or both. The facility determines when a menu becomes usable by (1) adding a startup application and determining when the application started up or (2) accessing the menu programmatically and determining when the menu appears. The facility determines when a user is able to launch an application by analyzing an event log or boot trace file that contains a log of system activity.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
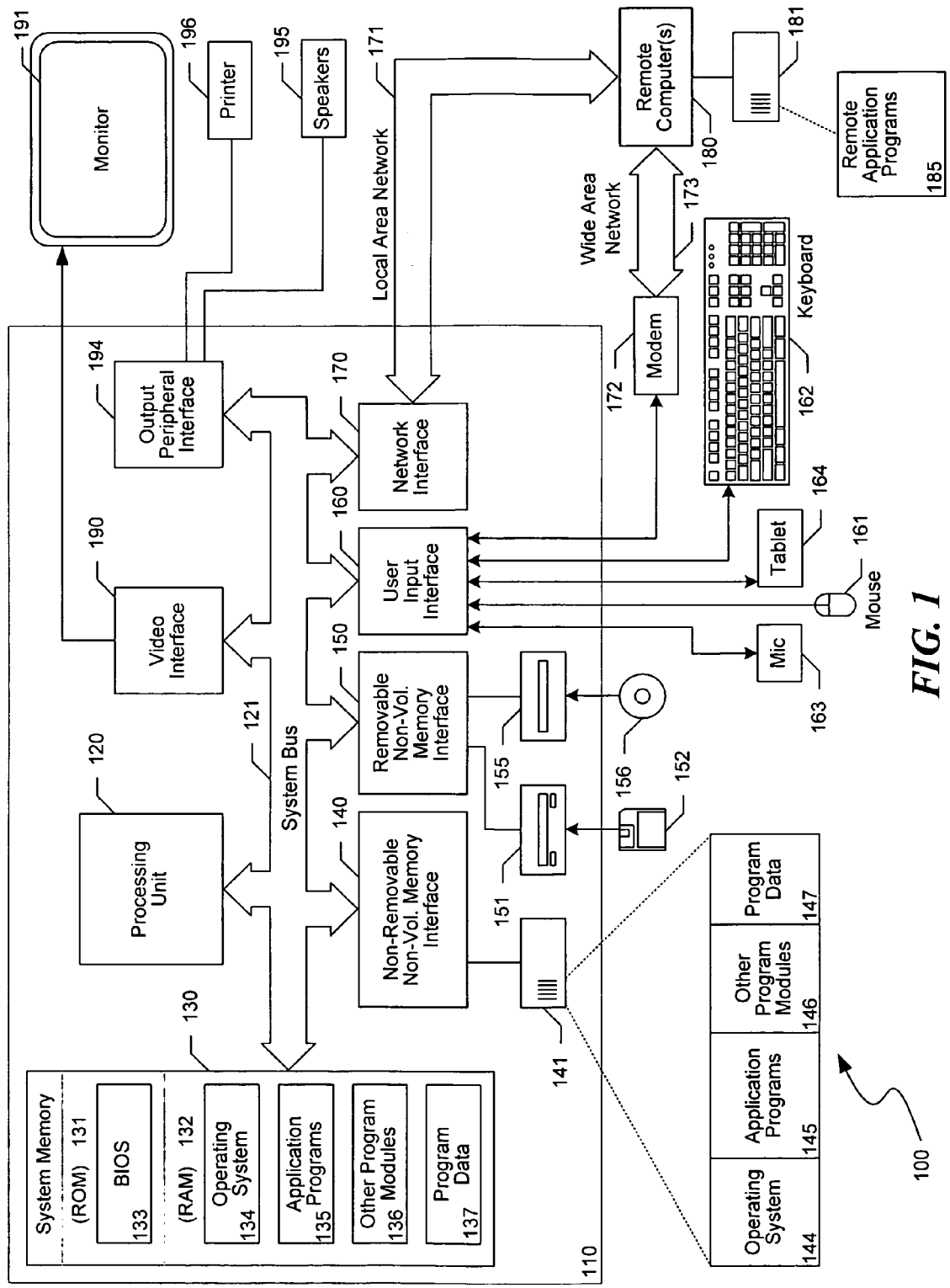
FIG. 1 is a block diagram illustrating an example of a suitable computing environment in which the facility may operate.

In various embodiments, the facility measures boot duration based on when a menu becomes usable, when a user is able to launch an application, or both.

In various embodiments, the facility determines when a menu becomes usable by (1) adding a startup application and determining when the application started up or (2) accessing the menu programmatically. These methods will now be described in detail. From a user's perspective, an operating system has completed booting up when it becomes usable, such as when the user can begin commanding the operating system to perform a task. In various operating systems, a user commands the operating system to perform a task by selecting the task from a menu. An example of such a menu is the "Start" menu in the MICROSOFT WINDOWS operating system. The applicants have discovered that the time at which a user can invoke an item in a menu highly correlates with the time at which the operating system invokes startup applications. Startup applications are applications that start automatically after a user logs into the operating system. As an example, a virus checking program can start automatically after the user logs in. To determine when startup applications start (e.g., to determine a boot end time), the facility provides a startup application that adds an entry to an event log. The event log is a log of events that are emitted by the operating system, applications, or other components associated with the operating system. Each event log entry indicates a date and time at which the entry was added to the event log. Thus, by measuring the difference between the boot start time and the time at which the facility's startup application adds the event log entry, the facility is able to determine the boot duration. Instead of employing an event log entry added by the startup application, the facility could equally determine the time of the startup application's invocation by using Event Tracing for WINDOWS, WINDOWS Management Instrumentation, an event log that records the creation and termination of processes, or any other mechanism that indicates the time at which a startup application starts.

As previously described, the facility can determine when a menu becomes usable by accessing the menu programmatically. As an example, the facility can provide a service (e.g., a daemon) that attempts to access the Start menu. When the Start menu appears, the service records the system time, which can be used as a proxy for boot end time. By measuring the difference between the boot start time and the time at which the service determines that the Start menu appeared (e.g., the boot end time), the facility is able to determine the boot duration.

In various embodiments, the facility determines when a user is able to launch an application by analyzing an event log or boot trace file that contains a log of system activity ("system log"). These methods will now be described in detail. The facility can analyze the system log to trace various system activities, such as disk input/output activity, page fault activity, and so forth. A page fault occurs when a memory management unit of a computing device accesses a memory page that is not mapped in primary storage (e.g., RAM). The page fault causes the operating system to load the accessed page from secondary storage (e.g., disk) into primary storage. The applicants have determined that an operating system's boot duration can be accurately estimated based on a time at which system activity (e.g., the number of page faults) within a time interval is a fraction of the peak system activity within a smaller time interval that occurs earlier. As an example, the number of page faults when an operating system first starts can be quite large and can diminish over time. In various embodiments, the facility locates a five-second time interval having the maximum number page faults between boot start and end times and finds a subsequent ten-second time interval that has 15% of the maximum number of page faults. The end of this ten-second duration is indicated to be the boot end time. The facility can alternatively employ other time durations and percentages. Various system activities can be analyzed instead of or in addition to page faults. As examples, the facility can analyze processor utilization, disk utilization, and so forth. In some embodiments, the facility determines the boot end time by calculating a trend line for system activity. As an example, the facility determines that the boot end time occurs when the trend line indicates that system activity is 15% of its maximum value. By calculating the difference between the boot start time and the boot end time, the facility can calculate boot duration.

Turning now to the figures, FIG. 1 is a block diagram illustrating an example of a suitable computing system environment 110 or operating environment in which the techniques or facility may be implemented. The computing system environment 110 is only one example of a suitable computing environment and is not intended to suggest any limitation as to the scope of use or functionality of the facility. Neither should the computing system environment 110 be interpreted as having any dependency or requirement relating to any one or a combination of components illustrated in the exemplary computing system 110.

The facility is operational with numerous other general purpose or special purpose computing system environments or configurations. Examples of well-known computing systems, environments, and/or configurations that may be suitable for use with the facility include, but are not limited to, personal computers, server computers, handheld or laptop devices, tablet devices, multiprocessor systems, microprocessor-based systems, set-top boxes, programmable consumer electronics, network PCs, minicomputers, mainframe computers, distributed computing environments that include any of the above systems or devices, and the like.

The facility may be described in the general context of computer-executable instructions, such as program modules, being executed by a computer. Generally, program modules include routines, programs, objects, components, data structures, and so forth that perform particular tasks or implement particular abstract data types. The facility may also be practiced in distributed computing environments where tasks are performed by remote processing devices that are linked through a communications network. In a distributed computing environment, program modules may be located in local and/or remote computer storage media, including memory storage devices.

With reference to FIG. 1, an exemplary system for implementing the facility includes a general purpose computing device in the form of a computer 100. Components of the computer 100 may include, but are not limited to, a processing unit 120, a system memory 130, and a system bus 121 that couples various system components, including the system memory 130 to the processing unit 120. The system bus 121 may be any of several types of bus structures, including a memory bus or memory controller, a peripheral bus, and a local bus using any of a variety of bus architectures. By way of example, and not limitation, such architectures include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as a Mezzanine bus.

The computer 100 typically includes a variety of computer-readable media. Computer-readable media can be any available media that can be accessed by the computer 100 and include both volatile and nonvolatile media and removable and nonremovable media. By way of example, and not limitation, computer-readable media may comprise computer storage media and communications media. Computer storage media include volatile and nonvolatile and removable and nonremovable media implemented in any method or technology for storage of information, such as computer-readable instructions, data structures, program modules, or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 100. Communications media typically embody computer-readable instructions, data structures, program modules, or other data in a modulated data signal, such as a carrier wave or other transport mechanism, and include any information delivery media. The term "modulated data signal" means a signal that has one or more of its characteristics set or changed in such a manner as to encode information in the signal. By way of example, and not limitation, communications media include wired media, such as a wired network or direct-wired connection, and wireless media, such as acoustic, RF, infrared, and other wireless media. Combinations of any of the above should also be included within the scope of computer-readable media.

The system memory 130 includes computer storage media in the form of volatile and/or nonvolatile memory, such as read only memory (ROM) 131 and random access memory (RAM) 132. A basic input/output system (BIOS) 133, containing the basic routines that help to transfer information between elements within the computer 100, such as during startup, is typically stored in ROM 131. RAM 132 typically contains data and/or program modules that are immediately accessible to and/or presently being operated on by the processing unit 120. By way of example, and not limitation, FIG. 1 illustrates an operating system 134, application programs 135, other program modules 136, and program data 137.

The computer 100 may also include other removable/non-removable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-ROM or other optical media. Other removable/nonremovable, volatile/nonvolatile computer storage media that can be used in the exemplary computing system environment 110 include, but are not limited to, magnetic tape cassettes, flash memory cards, digital versatile disks, digital video tapes, solid state RAM, solid state ROM, and the like. The hard disk drive 141 is typically connected to the system bus 121 through a nonremovable memory interface, such as an interface 140, and the magnetic disk drive 151 and optical disk drive 155 are typically connected to the system bus 121 by a removable memory interface, such as an interface 150.

The drives and their associated computer storage media, discussed above and illustrated in FIG. 1, provide storage of computer-readable instructions, data structures, program modules, and other data for the computer 100. In FIG. 1, for example, the hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers herein to illustrate that, at a minimum, they are different copies. A user may enter commands and information into the computer 100 through input devices, such as a tablet or electronic digitizer 164, a microphone 163, a keyboard 162, and a pointing device 161, commonly referred to as a mouse, trackball, or touch pad. Other input devices not shown in FIG. 1 may include a joystick, game pad, satellite dish, scanner, or the like. These and other input devices are often connected to the processing unit 120 through a user input interface 160 that is coupled to the system bus 121, but may be connected by other interface and bus structures, such as a parallel port, game port, or a universal serial bus (USB). A monitor 191 or other type of display device is also connected to the system bus 121 via an interface, such as a video interface 190. The monitor 191 may also be integrated with a touch-screen panel or the like. Note that the monitor 191 and/or touch-screen panel can be physically coupled to a housing in which the computer 100 is incorporated, such as in a tablet-type personal computer. In addition, computing devices such as the computer 100 may also include other peripheral output devices such as speakers 195 and a printer 196, which may be connected through an output peripheral interface 194 or the like.

The computer 100 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 100, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprisewide computer networks, intranets, and the Internet. For example, in the present facility, the computer 100 may comprise the source machine from which data is being migrated, and the remote computer 180 may comprise the destination machine. Note, however, that source and destination machines need not be connected by a network or any other means, but instead, data may be migrated via any media capable of being written by the source platform and read by the destination platform or platforms.

When used in a LAN networking environment, the computer 100 is connected to the LAN 171 through a network interface or adapter 170. When used in a WAN networking environment, the computer 100 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 100, or portions thereof, may be stored in the remote memory storage device 181. By way of example, and not limitation, FIG. 1 illustrates remote application programs 185 as residing on the memory storage device 181. It will be appreciated that the network connections shown are exemplary and other means of establishing a communications link between the computers may be used.

While various functionalities and data are shown in FIG. 1 as residing on particular computer systems that are arranged in a particular way, those skilled in the art will appreciate that such functionalities and data may be distributed in various other ways across computer systems in different arrangements. While computer systems configured as described above are typically used to support the operation of the facility, one of ordinary skill in the art will appreciate that the facility may be implemented using devices of various types and configurations, and having various components.

The techniques may be described in the general context of computer-executable instructions, such as program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

Figure 2:
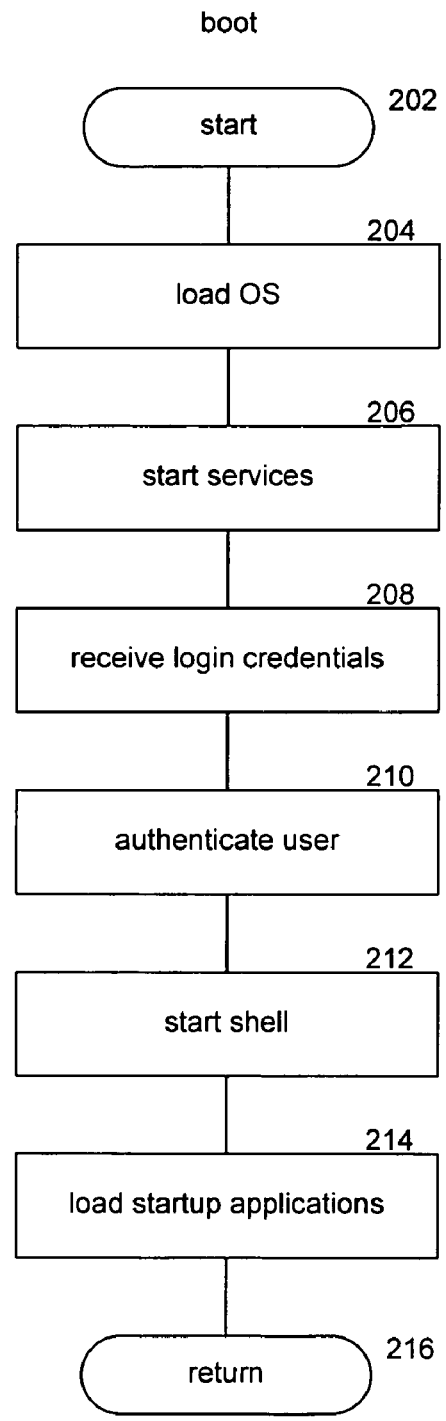
FIG. 2 is a flow diagram illustrating a boot routine invoked by the facility in some embodiments.

FIG. 2 is a flow diagram illustrating a boot routine invoked by an operating system in some embodiments. The routine begins at block 202.

At block 204, the routine loads the operating system ("OS"). As an example, the routine loads logic associated with the operating system, such as routines to load and start various operating system components.

At block 206, the routine starts various OS services. In some operating systems, OS services are referred to as daemons. Services and daemons are generally background processes that operate without any direct user input. Some services, such as a logon service, use input provided by users. An example of a service is an event service that receives information associated with various events and stores this information in an event log. The event service receives the information from other operating system components, such as other services and applications.

At block 208, the routine receives login credentials from a user. As an example, the routine receives an indication of the user's login ID and password.

At block 210, the routine authenticates the user. As an example, the routine determines whether the provided login ID and password are together valid.

At block 212, the routine starts the operating system's shell. As an example, in the MICROSOFT WINDOWS operating system environment, the routine starts the WINDOWS EXPLORER. In other operating systems, the routine may start other shells appropriate to those operating systems.

At block 214, the routine loads and invokes startup applications. Startup applications are applications that are indicated to be started by the operating system when a user logs in. As an example, an application's set-up routine adds the application to the list of applications to be started up automatically when a user logs in. As another example, a user can add various applications to the list of applications to be started up automatically.

At block 216, the routine returns.

Figure 3:
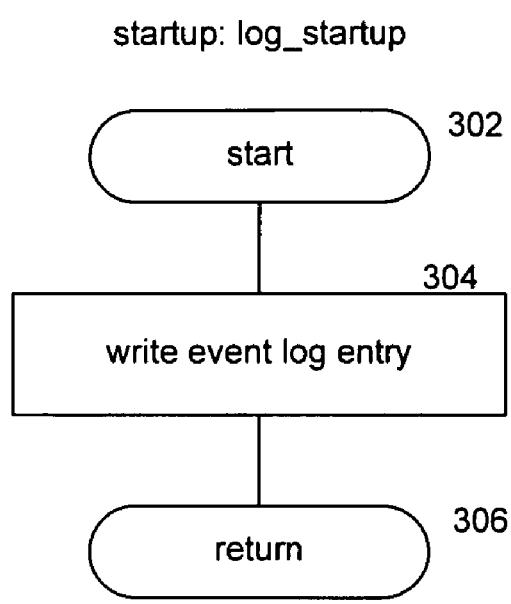
FIG. 3 is a flow diagram illustrating a log_startup routine invoked by the facility in some embodiments.

FIG. 3 is a flow diagram illustrating a log_startup routine invoked by the facility in some embodiments. The routine may be invoked by a lightweight startup program that the facility adds to the list of applications that are to be started up automatically. The facility can add the startup application to the beginning, or elsewhere in a list of startup applications. Where in the list the startup application appears may cause the facility to detect different boot end times. As an example, when the startup application appears first, the boot end time may be equivalent to when the start menu becomes visible. As another example, when the startup application appears last, the boot end time may be equivalent to when the start menu shows a list of applications, e.g., when invoked. The routine begins at block 302.

At block 304, the routine adds an event log entry. The content of the event log entry is inconsequential except that the time at which the event log entry is added indicates the time at which the routine was invoked.

At block 306, the routine returns.

The applicants have observed that there is a correlation between the boot end time and the time at which a start-up application launches. As an example, when the startup application that invokes the log_startup routine is the first startup application to launch, the facility can measure the boot duration as the difference in time between the time out which the event log entry was added and the boot start time. In some embodiments, the time at which the operating system started is also recorded in the event log entry by the operating system. As an example, the operating system may record the start time when it loads its various components.

In various embodiments, the facility may employ Event Tracing for WINDOWS, WINDOWS Management Instrumentation, or other techniques to determine when the startup applications launched instead of causing startup applications to add an event log entry.

Figure 4:
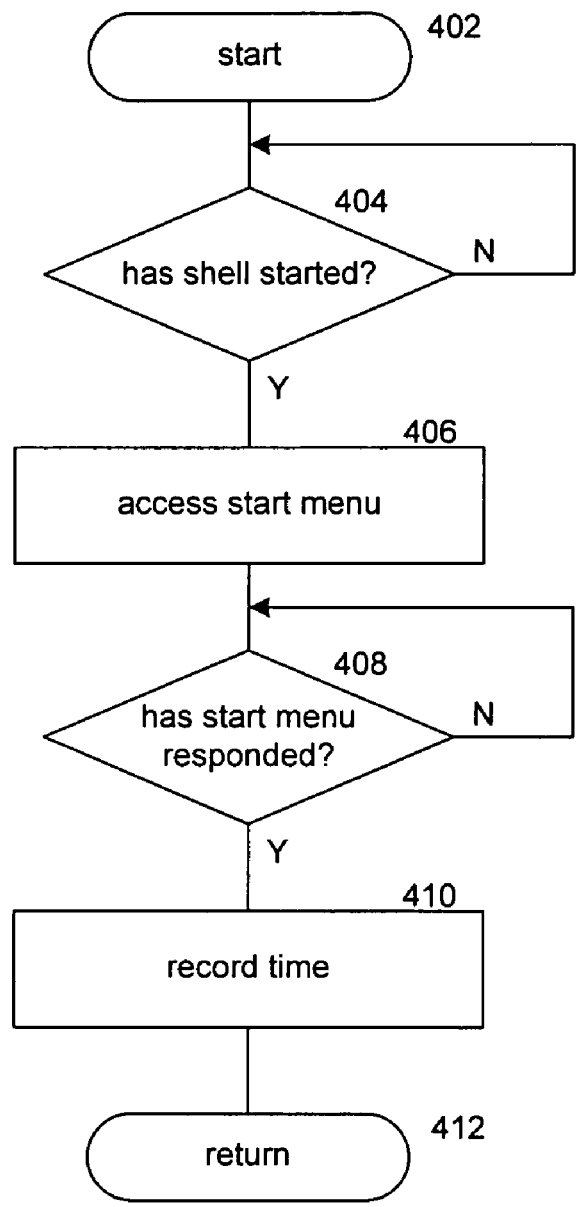
FIG. 4 is a flow diagram illustrating an access_menu routine invoked by the facility in some embodiments.

FIG. 4 is a flow diagram illustrating an access_menu routine invoked by the facility in some embodiments. The routine can be invoked by a service or an application to determine when a start menu is accessible. A start menu is a menu associated with an operating system that a user can use to start a task, such as an application. The routine begins at block 402.

At block 404, the routine determines whether the shell has started. As an example, in the WINDOWS operating system, the routine determines whether WINDOWS EXPLORER has started. If the shell has started, the routine continues at block 406. Otherwise, the routine loops at block 404 until the shell starts.

At block 406, the routine accesses the start menu programmatically. As an example, the routine invokes an application program interface provided by the operating system to invoke the start menu.

At block 408, the routine determines whether the start menu has responded. As an example, the routine may receive an indication from the operating system that the start menu has responded. If the start menu has responded, the routine continues at block 410. Otherwise, the routine loops at block 408 until the start menu responds.

At block 410, the routine records the system time. This time indicates the boot end time.

At block 412, the routine returns.

Figure 5:
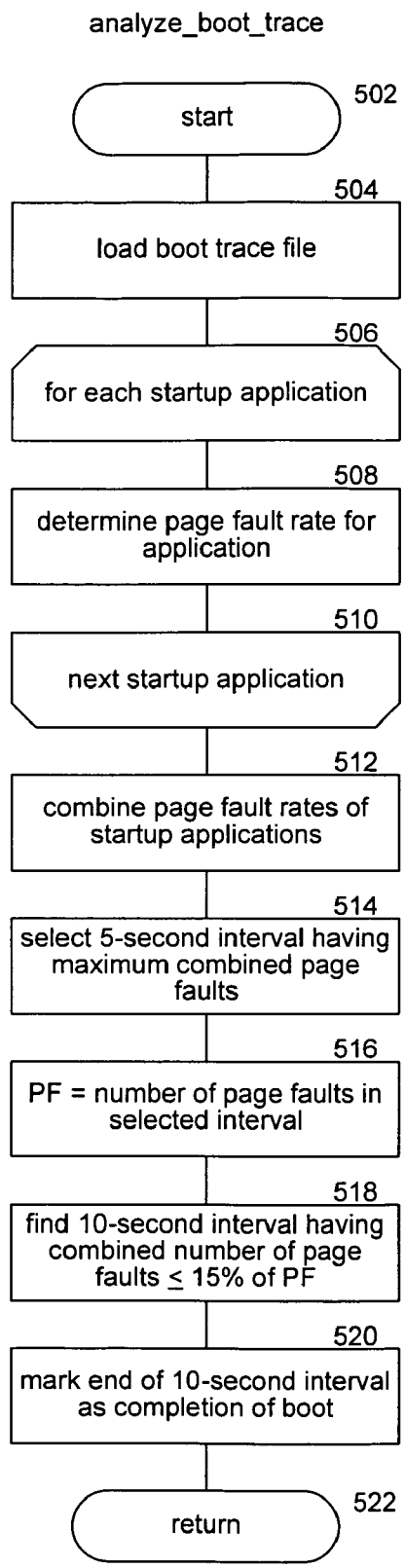
FIG. 5 is a flow diagram illustrating an analyze_boot_trace routine invoked by the facility in some embodiments.

FIG. 5 is a flow diagram illustrating an analyze_boot_trace routine invoked by the facility in some embodiments. In various embodiments, the facility analyzes an event log or a boot trace file to determine the boot end time. As an example, the facility can use Event Tracing for WINDOWS to track system activity during the boot-up process and store the tracked information in a boot trace file. Although various system activities can be analyzed, the following discussion analyzes page faults. The routine begins at block 502.

At block 504, the routine loads a boot trace file.

Between the loop of blocks 506 and 510, the routine determines a page fault rate for startup applications. At block 506, the routine selects a startup application.

At block 508, the routine determines the page fault rate for the selected application. As an example, the routine determines the number of page faults associated with the selected application in quarter-second intervals beginning at the time the application starts.

At block 510, the routine selects another startup application. When all startup applications have been processed, the routine continues at block 512. Otherwise, the routine continues at block 508.

At block 512, the routine combines the page fault rates of the startup applications. The facility may combine the page fault rates in various ways. As an example, the facility may combine the page fault rates by calculating an average of the page fault rates for each application. Alternatively, the facility may combine the page fault rates by calculating a total of the number of page faults in every quarter-second interval.

At block 514, the routine selects the five-second time interval having the maximum combined number of page faults.

At block 516, the routine set a variable PF to the number of page faults in the selected five-second time interval.

At block 518, the routine finds the first ten-second time interval having a combined number of page faults that is less than or equal to 15% of the value indicated by the variable PF. In some embodiments, the routine finds the last ten-second time interval (or some other ten-second time interval) having a combined number of page faults that is less than or equal to 15% of the value indicated by the variable PF.

At block 520, the routine identifies a time during the ten-second time interval as the boot end time. As an example, the routine can identify the start, end or some other time during this duration as the boot end time.

At block 522, the routine returns.

By using five- and ten-second intervals, the routine avoids identifying temporary spikes or dips in page fault activity.

Figure 6:
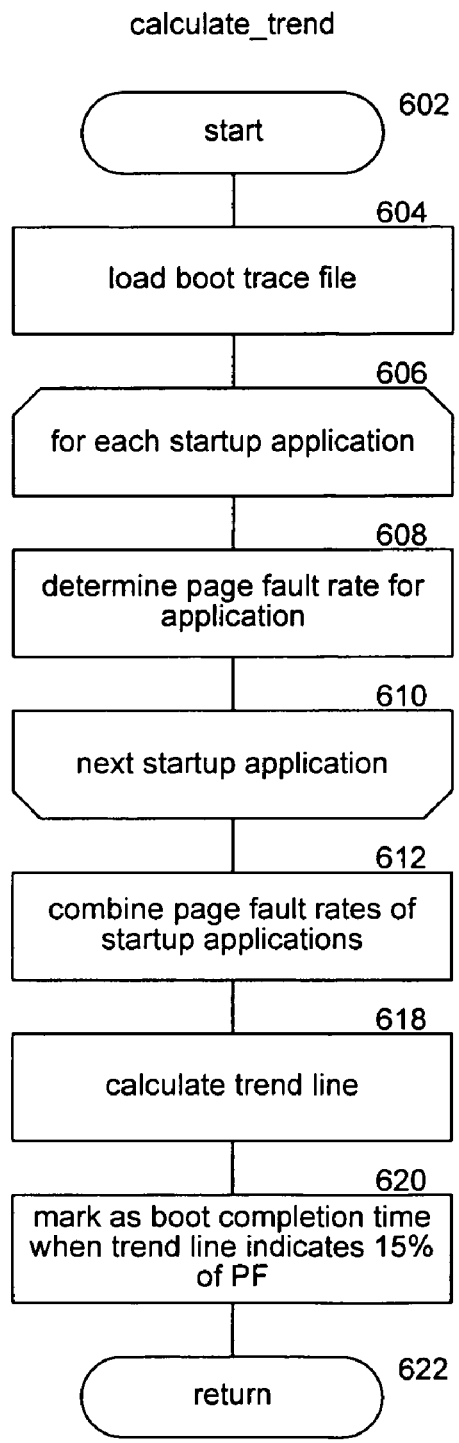
FIG. 6 is a flow diagram illustrating a calculate_trend routine invoked by the facility in some embodiments.

FIG. 6 is a flow diagram illustrating a calculate_trend routine invoked by the facility in some embodiments. The calculate_trend routine is similar to the analyze_boot_trace routine except that a trend line is calculated and analyzed rather than time intervals. The routine begins at block 602.

At block 604, the routine loads a boot trace file.

Between the loop of blocks 606 and 610, the routine determines a page fault rate for startup applications. At block 606, the routine selects a startup application.

At block 608, the routine determines the page fault rate for the selected application. As an example, the routine determines the number of page faults associated with the selected application in quarter-second intervals beginning at the time the application starts.

At block 610, the routine selects another start-up application. When all startup applications have been processed, the routine continues at block 612. Otherwise, the routine continues at block 608.

At block 612, the routine combines the page fault rates of the startup applications. The facility may combine the page fault rates in various ways. As an example, the facility may combine the page fault rates by calculating an average of the page fault rates for each application. Alternatively, the facility may combine the page fault rates by calculating a total of the number of page faults in every quarter-second interval.

At block 618, the routine calculates a trend line for the combined page faults. As an example, the routine can calculate a linear, quadratic, or cubic trend line.

At block 620, the routine indicates that the boot end time occurs when the trend line reaches 15% of its peak.

At block 622, the routine returns.

Figure 7:
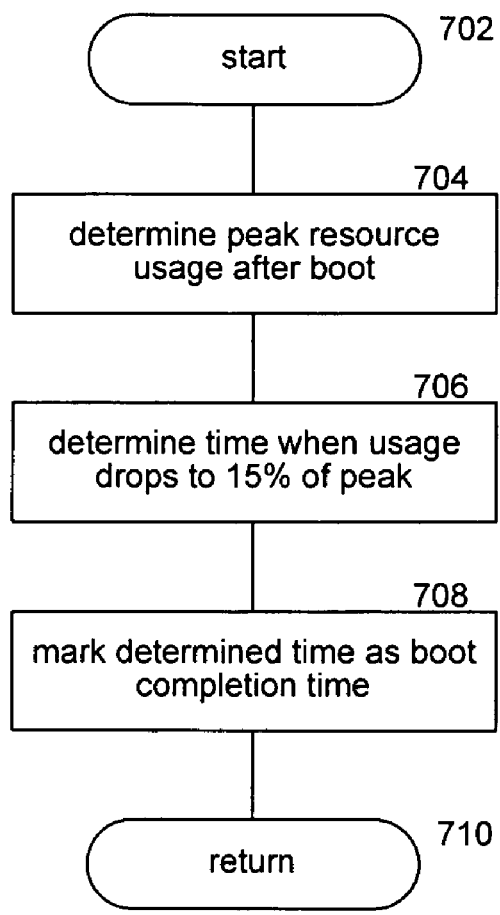
FIG. 7 is a flow diagram illustrating an analyze_system_activity routine invoked by the facility in some embodiments.

FIG. 7 is a flow diagram illustrating an analyze_system_activity routine invoked by the facility in some embodiments. The facility employs the routine to analyze resource activity, such as processor utilization, disk utilization, page fault activity, and so forth. The routine begins at block 702.

At block 704, the routine determines peak utilization after the operating system boots. In various embodiments, the routines of FIGS. 5 and 6 can be employed with the routine of FIG. 7 to locate the peak.

At block 706, the routine determines the time at which utilization first drops to 15% of the peak.

At block 708, the routine indicates the determined time as the boot end time.

At block 710, the routine returns.

In various embodiments, percentages other than 15% and time intervals other than a quarter second, five seconds, or ten seconds can be used in relation to the logic described herein.

Those skilled in the art will appreciate that the blocks illustrated in FIGS. 2-7 and described above may be altered in a variety of ways. For example, the order of the blocks and their associated logic may be rearranged, additional logic may be performed in parallel, shown blocks may be omitted, or other blocks and associated logic may be included, and so forth.

It will be appreciated by those skilled in the art that the above-described facility may be straightforwardly adapted or extended in various ways. For example, various system resources may be analyzed for activity to determine when the boot-up process completes. While the foregoing description makes reference to particular embodiments, the scope of the invention is defined solely by the claims that follow and the elements recited therein.

We claim:

1. A computer-readable storage medium storing computer-executable instructions for performing a method of measuring an operating system's boot duration, the method comprising:
    loading a log file containing indications of system activity occurring during a boot process;
    identifying a first time interval having a peak system activity wherein the system activity is measured based on a number of page faults that occur within the first time interval;
    identifying a second time interval after the first time interval such that the second time interval has a selected fraction of the peak system activity wherein the selected fraction of the peak system activity is measured based on a number of page faults that occur within the second time interval; and
    indicating that the boot process completes when the selected fraction of the pick system activity is less than a specified threshold at a time during the second time interval, wherein the boot duration is a difference between the start of the first time interval and the end of second time interval.

2. The computer-readable medium of claim 1 wherein the log file is an event log file.

3. The computer-readable medium of claim 1 wherein the log file is a boot trace file.

4. The computer-readable medium of claim 1 wherein the first time interval is a five-second time interval.

5. The computer-readable medium of claim 4 wherein the second time interval is a ten-second time interval.

6. The computer-readable medium of claim 1 wherein the selected fraction is fifteen percent.

7. The computer-readable medium of claim 1 wherein the boot process completes at the end of the second time interval.

* * * * *